US009426058B2

(12) United States Patent
Mitsumori

(10) Patent No.: US 9,426,058 B2
(45) Date of Patent: Aug. 23, 2016

(54) TRANSMISSION EQUIPMENT AND TRANSMISSION METHOD

(71) Applicant: FUJITSU LIMITED, Kawasaki-shi, Kanagawa (JP)

(72) Inventor: Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 14/304,409

(22) Filed: Jun. 13, 2014

(65) Prior Publication Data
US 2015/0003230 A1 Jan. 1, 2015

(30) Foreign Application Priority Data

Jun. 28, 2013 (JP) ................. 2013-136372

(51) Int. Cl.
*H04L 12/701* (2013.01)
*H04L 12/707* (2013.01)
*H04L 12/751* (2013.01)

(52) U.S. Cl.
CPC ........... *H04L 45/22* (2013.01); *H04L 45/02* (2013.01)

(58) Field of Classification Search
None
See application file for complete search history.

(56) References Cited

U.S. PATENT DOCUMENTS

| 7,016,379 | B2* | 3/2006 | Falkenstein et al. ......... 370/535 |
| 2004/0001496 | A1* | 1/2004 | Yusko et al. .................. 370/401 |
| 2006/0250951 | A1 | 11/2006 | Ueda et al. |
| 2008/0025332 | A1* | 1/2008 | Wang et al. .................. 370/410 |
| 2010/0246425 | A1 | 9/2010 | Hachiya et al. |
| 2013/0022052 | A1* | 1/2013 | Takase et al. ................ 370/409 |
| 2014/0146663 | A1* | 5/2014 | Rao et al. .................... 370/228 |

FOREIGN PATENT DOCUMENTS

| JP | 11-252145 | 9/1999 |
| JP | 2010-239593 | 10/2010 |
| WO | 2005-057864 | 6/2005 |

* cited by examiner

*Primary Examiner* — Chi H Pham
*Assistant Examiner* — Shick Hom
(74) *Attorney, Agent, or Firm* — Fujitsu Patent Center

(57) ABSTRACT

Transmission equipment includes: a first interface unit configured to receive a frame; and a second interface unit configured to transmit the received frame received by the first interface unit. The second interface unit includes a transmission circuit configured to transmit path information that represents a state of a logical path pair including a work path and a protection path provided for the received frame to the first interface unit. The first interface unit includes a destination determination circuit configured to determine a destination of the received frame based on the state of the logical path pair represented by the path information received from the second interface unit.

15 Claims, 13 Drawing Sheets

FIG. 7

<IF UNIT11#1>

| INDEX: VID | VID FLAG | OAM FLAG | D-SIDE PROTECTION FLAG | S-SIDE PROTECTION FLAG | PID | FIRST DESTINATION | ... | SECOND DESTINATION |
|---|---|---|---|---|---|---|---|---|
| VID=100 | 1 | 0 | 1 | 0 | 5 | IF CARD#2, PORT#1 | ... | IF CARD#3, PORT#1 |

<IF UNIT11#2>

| INDEX: VID | VID FLAG | OAM FLAG | D-SIDE PROTECTION FLAG | S-SIDE PROTECTION FLAG | PID | FIRST DESTINATION | ... | SECOND DESTINATION |
|---|---|---|---|---|---|---|---|---|
| VID=100 | 1 | 1 | 0 | 1 | 5 | IF CARD#1, PORT#1 | ... | NOT USED |

<IF UNIT11#3>

| INDEX: VID | VID FLAG | OAM FLAG | D-SIDE PROTECTION FLAG | S-SIDE PROTECTION FLAG | PID | FIRST DESTINATION | ... | SECOND DESTINATION |
|---|---|---|---|---|---|---|---|---|
| VID=100 | 1 | 1 | 0 | 1 | 5 | IF CARD#1, PORT#1 | ... | NOT USED |

PID INFORMATION

| B7 | B6 | B5 | B4 | B3 | B2 | B1 | B0 |
|----|----|----|----|----|----|----|----|

B7: WORK PATH VALIDITY BIT (0: INVALID, 1: VALID)

B6: WORK PATH STATE BIT (0: NORMAL, 1: FAILURE)

B5: PROTECTION PATH VALIDITY BIT (0: INVALID, 1: VALID)

B4: PROTECTION PATH STATE BIT (0: NORMAL, 1: FAILURE)

B3: FORCED PATH SETTING BIT (0: INVALID, 1: VALID)

B2: FORCED PATH BIT (0: FIRST DESTINATION, 1: SECOND DESTINATION)

B1: RESERVED BIT

B0: RESERVED BIT

FIG. 8

<IF UNIT11#2 (WORK PATH IS NORMAL)>

| INDEX: PID | B7 | B6 | B5 | B4 | B3 | B2 | B1 | B0 |
|---|---|---|---|---|---|---|---|---|
| | | | | ⋮ | | | | |
| PID=5 | 1 | 0 | 0 | 0 | 0 | 0 | 0 | 0 |
| | | | | ⋮ | | | | |

F I G. 9 A

<IF UNIT11#2 (WORK PATH IS FAILED)>

| INDEX: PID | B7 | B6 | B5 | B4 | B3 | B2 | B1 | B0 |
|---|---|---|---|---|---|---|---|---|
| | | | | ⋮ | | | | |
| PID=5 | 1 | 1 | 0 | 0 | 0 | 0 | 0 | 0 |
| | | | | ⋮ | | | | |

F I G. 9 B

<IF UNIT11#3 (WORK PATH IS NORMAL)>

| INDEX: PID | B7 | B6 | B5 | B4 | B3 | B2 | B1 | B0 |
|---|---|---|---|---|---|---|---|---|
| | | | | ⋮ | | | | |
| PID=5 | 0 | 0 | 1 | 0 | 0 | 0 | 0 | 0 |
| | | | | ⋮ | | | | |

F I G. 9 C

<IF UNIT11#3 (WORK PATH IS FAILED)>

| INDEX: PID | B7 | B6 | B5 | B4 | B3 | B2 | B1 | B0 |
|---|---|---|---|---|---|---|---|---|
| | | | | ⋮ | | | | |
| PID=5 | 0 | 0 | 1 | 0 | 0 | 0 | 0 | 0 |
| | | | | ⋮ | | | | |

F I G. 9 D

<IF UNIT11#1(WORK PATH IS NORMAL)>

| INDEX: PID | B7 | B6 | B5 | B4 | B3 | B2 | B1 | B0 |
|---|---|---|---|---|---|---|---|---|
| | ⋮ | | | | | | | |
| PID=5 | 1 | 0 | 1 | 0 | 0 | 0 | 0 | 0 |
| | ⋮ | | | | | | | |

F I G. 1 0 A

<IF UNIT11#1(WORK PATH IS FAILED)>

| INDEX: PID | B7 | B6 | B5 | B4 | B3 | B2 | B1 | B0 |
|---|---|---|---|---|---|---|---|---|
| | ⋮ | | | | | | | |
| PID=5 | 1 | 1 | 1 | 0 | 0 | 0 | 0 | 0 |
| | ⋮ | | | | | | | |

F I G. 1 0 B

TRANSMISSION EQUIPMENT AND TRANSMISSION METHOD

CROSS-REFERENCE TO RELATED APPLICATION

This application is based upon and claims the benefit of priority of the prior Japanese Patent Application No. 2013-136372, filed on Jun. 28, 2013, the entire contents of which are incorporated herein by reference.

FIELD

The embodiments discussed herein are related to equipment and a method for transmitting a frame or a packet.

BACKGROUND

As the Internet, mobile communications and the like have become widespread, carrier networks provided by telecommunication carriers are shifting from TDM networks such as SONET/SDH (Synchronous Optical NETwork/Synchronous Digital Hierarchy) or the like to packet networks that utilize the Ether (registered trademark) techniques and the IP techniques. Also, redundant network configurations have been implemented in practical use in order to enhance the reliability of networks. The standardization related to redundant configurations is described in, for example, ITU-T G.8031 (Ethernet Protection Switching).

In a redundant configuration, a plurality of logical paths (for example, a work path and a protection path) are configured for one communication flow. A communication flow is identified by for example a MAC address, a virtual LAN identifier, etc. Also, a work path and its protection path are configured in different routes. A data packet of a communication flow is transmitted through for example a work path. In such a case, when a failure has occurred in the work path, the data packet of the communication flow is transmitted through the corresponding protection path. In other words, path switching is performed from a work path to a protection path.

FIG. 1 illustrates an example of a method of switching from a work path to a protection path. Transmission equipment 1000(1000A, 1000B) includes a plurality of IF (interface) units as illustrated in FIG. 1. A work path and a protection path are configured between the transmission equipment 1000A and the transmission equipment 1000B. The transmission equipment 1000A transmits a data packet through the work path. For this transmission, in the transmission equipment 1000A, ingress-side IF unit #1 sets destination information in the data packet so that the data packet is guided to egress-side IF unit #6. By so doing, switch SW guides the data packet to egress-side IF unit #6 and egress-side IF unit #6 transmits the data packet to the transmission equipment 1000B through the work path. Accordingly, the transmission equipment 1000B receives the data packet through the work path.

Transmission equipment 1000 transmits monitoring packets for example periodically through respective logical paths (i.e., a work path and a protection path). In FIG. 1, transmission routes of a monitoring packet are depicted by dashed lines. The transmission equipment 1000 monitors a failure in logical paths based on monitoring packets transmitted from a correspondent transmission equipment. In the transmission equipment 1000A for example, egress-side IF unit #6 receives, through a work path, a monitoring packet transmitted from the transmission equipment 1000B. Then, the CPU of IF unit #6 guides that monitoring packet to a monitoring unit. Further, the monitoring unit transmits that monitoring packet to ingress-side IF unit #1. Further, the CPU of IF unit #1 determines the state of the work path based on that monitoring packet (or based on the fact that a monitoring packet does not arrive).

When, for example, the CPU of ingress-side IF unit #1 does not receive a monitoring packet via IF unit #6, the CPU determines that a failure has occurred in the work path. In such a case, ingress-side IF unit #1 sets destination information in a data packet so that a data packet is guided to egress-side IF unit #7. Then, switch SW guides that data packet to egress-side IF unit #7, and IF unit #7 transmits that data packet to the transmission equipment 1000B through a protection path. Accordingly, the transmission equipment 1000B receives the data packet through a protection path. In other words, path switching is performed from a work path to a protection path.

A method of path switching from a work path to a protection path is described in for example Japanese Laid-open Patent Publication No. 2010-239593 (Japanese Patent No. 4724763).

It is desirable that path switching from a work path to a protection path be performed in a short period of time in networks having a redundant configuration. In a SONET/SDH network for example, it is required that a switching process be executed within 50 milliseconds. Accordingly, it is desirable that a switching process be executed within 50 milliseconds also in a packet network.

However, in the transmission system illustrated in FIG. 1, the CPU of an ingress-side IF unit monitors a monitoring packet being guided from an egress-side IF unit to the ingress-side IF unit via the CPU of a monitoring unit so as to perform the path switching. In other words, the path switching is implemented by a software process. This causes a possibility that a long period of time is taken from the occurrence of a failure in a work path until the completion of the path switching.

Also, it is possible to provide a plurality of logical paths in one physical link by using a multiplexing technique. In such a case, when a failure has occurred in that physical link, path switching has to be performed for the plurality of logical paths. However, in the configuration illustrated in FIG. 1, path switching processes for a plurality of logical paths are sequentially performed by software. It is now assumed for example that the software processing time required for the path switching for one logical path is 100µ seconds and 2000 logical paths are provided for a physical link in which a failure has occurred. In such a case, switching of all the logical paths requires approximately 200 milliseconds.

SUMMARY

According to an aspect of the embodiments, transmission equipment includes: a first interface unit configured to receive a frame; and a second interface unit configured to transmit the received frame received by the first interface unit. The second interface unit includes a transmission circuit configured to transmit path information that represents a state of a logical path pair including a work path and a protection path provided for the received frame to the first interface unit. The first interface unit includes a destination determination circuit configured to determine a destination of the received frame based on the state of the logical path pair represented by the path information received from the second interface unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a received frame table;

FIG. 8 illustrates a data structure of a PID table;

FIGS. 9A-9D illustrate examples of the PID table;

FIGS. 10A and 10B illustrate examples of a path state management table;

DESCRIPTION OF EMBODIMENTS

Figure 1:
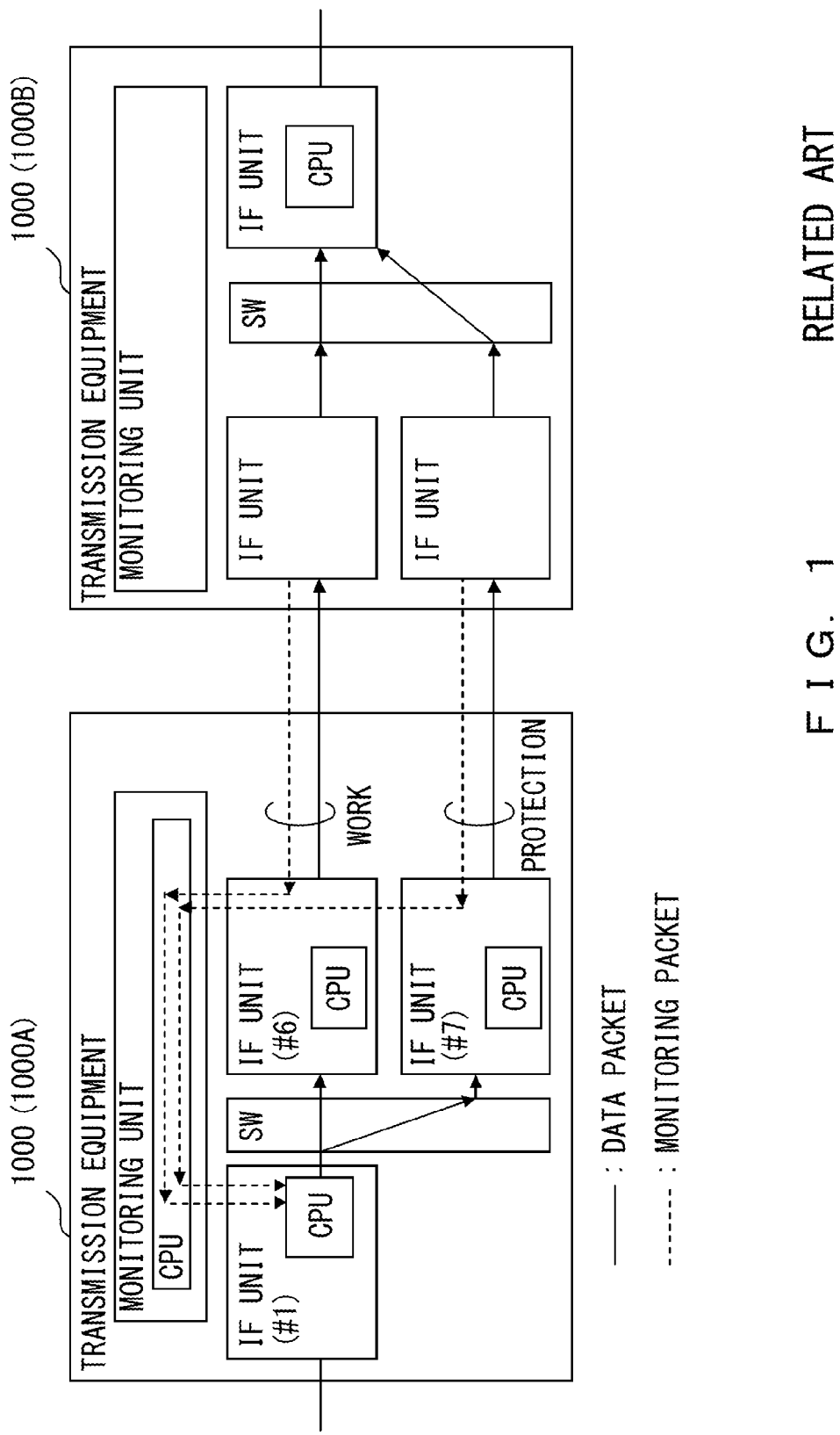
FIG. 1 illustrates an example of a method of switching from a work path to a protection path.
Figure 2:
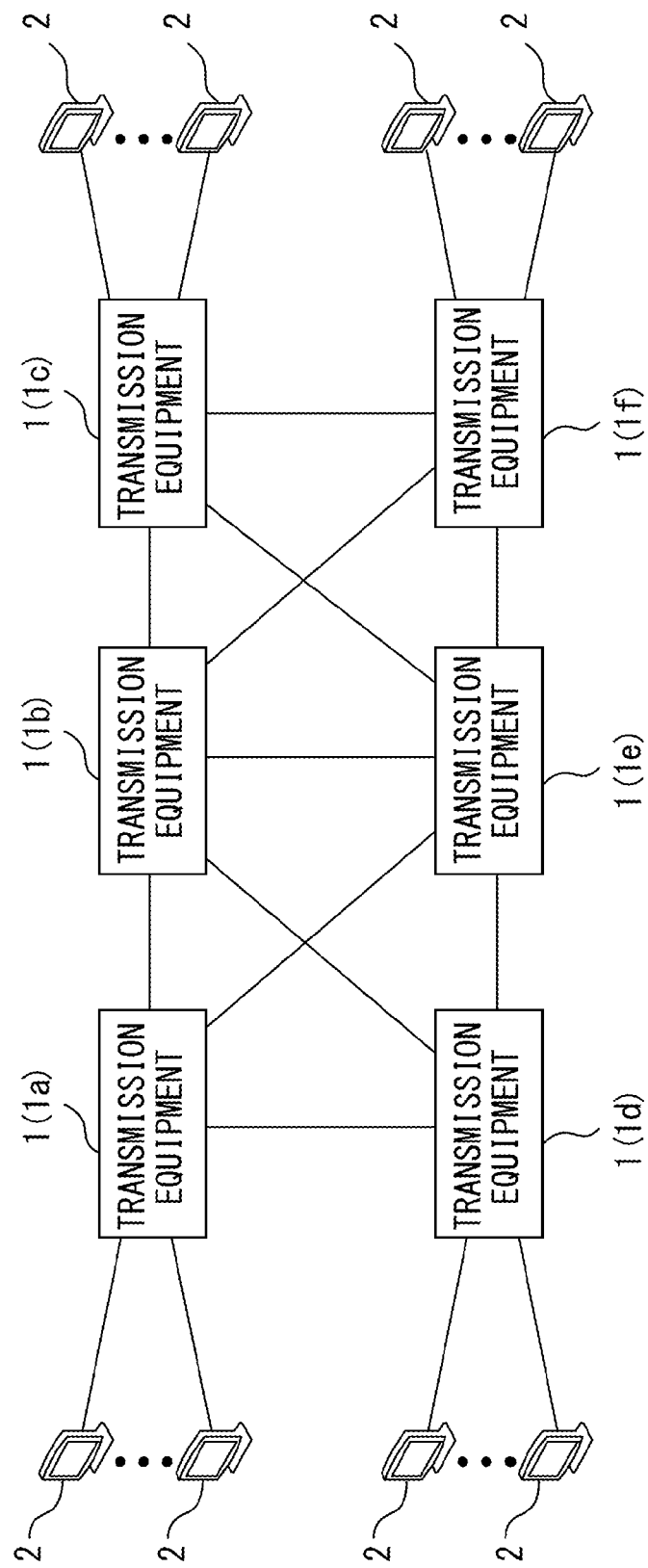
FIG. 2 illustrates an example of a network in which transmission equipment of an embodiment is used.

FIG. 2 illustrates an example of a network in which transmission equipment of an embodiment of the present invention is used. This network includes a plurality of transmission equipments 1 (1*a* through 1*f*) as illustrated in FIG. 2. The transmission equipment 1 is connected to another transmission equipment 1 through for example an optical fiber. For example, the transmission equipment 1*a* is connected to the transmission equipment 1*b*, the transmission equipment 1*d* and the transmission equipment 1*e*. The transmission equipment 1*b* is connected to the transmission equipment 1*a*, the transmission equipment 1*c*, the transmission equipment 1*d*, the transmission equipment 1*e* and the transmission equipment 1*f*. In addition, the transmission equipment 1 can accommodate one or a plurality of user terminals 2. In the example illustrated in FIG. 1, the transmission equipment 1*a*, the transmission equipment 1*c*, the transmission equipment 1*d* and the transmission equipment 1*f* respectively accommodate a plurality of user terminals 2.

The transmission equipment 1 forwards a frame received from the user terminal 2 or different transmission equipment 1 to a destination. In other words, the transmission equipment 1 can forward a received frame based on the destination address in the frame. For example, when an Ethernet frame or an IP frame is transmitted from the user terminal 2, the transmission equipment 1 performs a forwarding process of that frame based on the MAC address, the IP address or the like stored in the received frame. Note that a frame and a packet are not discriminated in this document. Accordingly, "frame" is assumed to include "packet".

Figure 3:
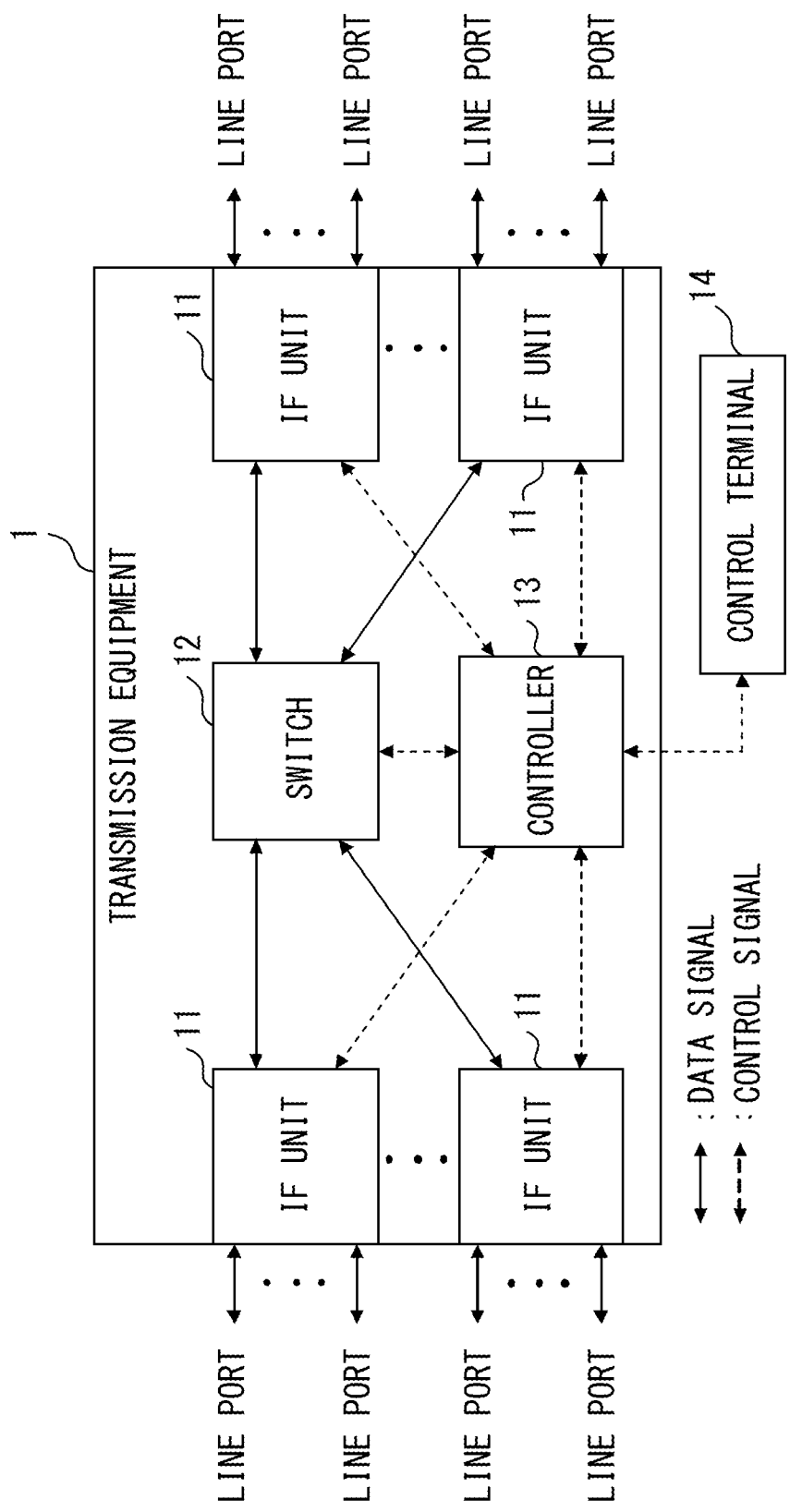
FIG. 3 illustrates a configuration of the transmission equipment.

FIG. 3 illustrates a configuration of the transmission equipment 1. As illustrated in FIG. 3, the transmission equipment 1 includes a plurality of IF (interface) units 11, a switch 12 and a controller 13. Also, a control terminal 14 is connected to the transmission equipment 1.

Each of the IF units 11 includes a plurality of ports. In this example, the transmission equipment 1 includes a pair of an input port and an output port for one correspondent equipment (another transmission equipment 1 or the user terminal 2). In other words, the transmission equipment 1 receives via the input port a frame transmitted from correspondent equipment and outputs a frame to the correspondent equipment via the output port.

The IF unit 11 terminates a frame received via the port, and transmits that frame to the switch 12. Also, the IF unit 11 outputs the frame guided from the switch 12 to the destination of that packet via a corresponding port. The IF unit 11 is implemented by for example a removable module, a board or a card.

The switch 12 is connected to the plurality of IF units 11. The switch 12 guides a frame input from the IF unit 11 to the IF unit 11 corresponding to the destination of the frame. The switch 12 includes a processor that controls frame transfer, a memory and a hardware circuit. Also, the switch 12 is implemented by for example a removable module, a board or a card.

The controller 13 includes a CPU and a memory, and controls operations of the IF units 11 and the switch 12. The controller 13 can also collect alarm information and/or statistical information. The controller 13 is implemented by for example a removable module, a board or a card.

The control terminal 14 is a computer connected to the controller 13, and gives the transmission equipment 1 an instruction from a user or a network administrator. The control terminal 14 may be part of the transmission equipment 1.

The IF units 11, the switch 12 and the controller 13 do not have to be removable independently, and may be implemented, for example, on a mother board. Also, the transmission equipment 1 may include other elements in addition to the IF units 11, the switch 12 and the controller 13.

Figures 4A, 4B:
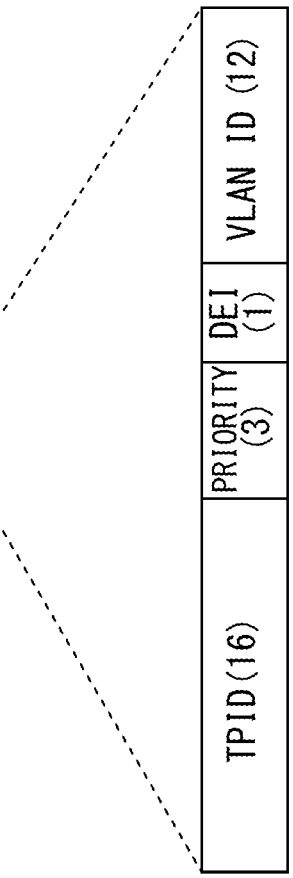
FIGS. 4A and 4B illustrate examples of formats of frames transmitted by the transmission equipment.

FIGS. 4A and 4B illustrate examples of formats of frames transmitted by the transmission equipment 1. In these examples, it is assumed that the transmission equipment 1 transmits an Ethernet frame. The bracketed numbers in FIG. 4A and FIG. 4B represent the numbers of bits.

An Ethernet frame includes, as illustrated in FIG. 4A, a destination MAC address (MAC DA), a source MAC address (MAC SA), an Ethernet type (E-type), a protocol data unit (PDU) and a frame check sequence (FCS). Ethernet type identifies the type of a message stored in the protocol data unit. As an example, 0x0800 represents an IPv4 frame. Ethernet type is defined for example by IRNA. A protocol data unit stores a message in a higher layer. For example, user data is stored in this protocol data unit. A frame check sequence is used for detecting a frame error, and is implemented by for example a CRC32 code.

FIG. 4B illustrates a format of an Ethernet frame to which a ULAN tag is added. A VLAN tag includes a tag protocol identifier (TPID), a priority, (Priority), a DEI (Drop Eligible Indicator) and a virtual LAN identifier (ULAN ID). For a tag protocol identifier, a value representing that a virtual LAN identifier is stored in a frame is set. For example, 0x8100, which is defined by IEEE802.1Q, is set as a tag protocol identifier. A priority represents a priority of a frame itself. In the example illustrated in FIG. 4B, the priority uses three bits, and can represent priorities in eight classes. DEI represents a discarding priority. When a network is congested, a frame in which DEI=1 is set is discarded with priority. A virtual LAN identifier can identify a user. Note that a combination of a tag protocol identifier and a virtual LAN identifier is referred to as a VLAN tag.

Figure 5:
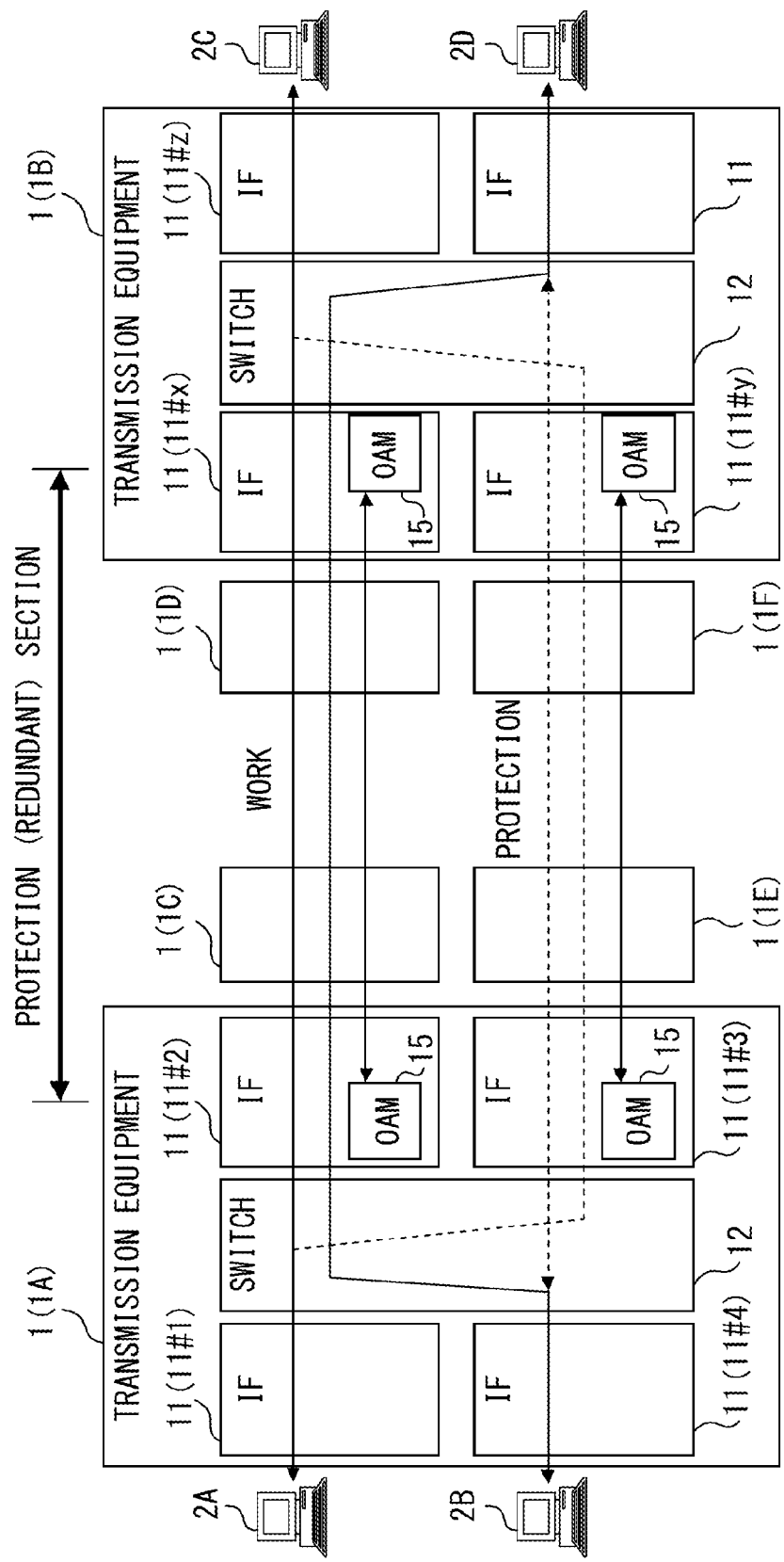
FIG. 5 illustrates an example of path protection.

FIG. 5 illustrates an example of path protection. In the example illustrated in FIG. 5, transmission equipment 1A accommodates user terminals 2A and 2B. Also, the transmission equipment 1B accommodates user terminals 2C and 2D.

In this situation, path protection is configured for data flow between the user terminals 2A and 2C, and path protection is configured for data flow between the user terminals 2B and 2D.

Path protection (or path redundancy) is implemented by a pair of logical paths (a work path and a protection path). For example, path protection for a data flow between the user terminals 2A and 2C is implemented by a work path provided on a route via transmission equipment 1C and transmission equipment 1D, and a protection path provided on a route via transmission equipment 1E and transmission equipment 1F.

The transmission equipment 1 includes the plurality of IF units 11 and the switch 12. For example, the transmission equipment 1A includes IF units 11#1 through 11#4 and the switch 12 as illustrated in FIG. 5. The user terminal 2A is accommodated in IF unit 11#1 of the transmission equipment 1A, and the user terminal 2B is accommodated in IF unit 11#4 of the transmission equipment 1A. Also, IF unit 11#2 and IF unit 11#3 of the transmission equipment 1A are connected to the transmission equipment 1C and the transmission equipment 1E, respectively.

In the example illustrated in FIG. 5, 1:1 path protection is implemented. In 1:1 path protection, a data frame is transmitted via either a work path or a protection path.

For example, a data frame transmitted from the user terminal 2A is received by IF unit 11#1 of the transmission equipment 1A. IF unit 11#1 guides the received data frame to IF unit 11#2. Then, this data frame is transmitted to the transmission equipment 1B through the work path. The transmission equipment 1B forwards this received data frame to the user terminal 2C. In this process, 1:1 path protection does not transmits that data frame through a protection path.

Note that whether or not to implement path protection may be determined for each user (or for each data flow). Also, a work path and a protection path can be configured on desired routes, respectively.

In a transmission system that implements path protection, an OAM (Operation Administration and Maintenance) frame is transmitted in order to monitor connection states of a work path and a protection path. OAM frame is defined by for example ITU-T Y.1731. The format of OAM frame is as illustrated in FIG. 4A or FIG. 4B. However, a value representing an OAM frame (for example "0x8902") is set as the Ethernet type of an OAM frame. Also, as the PDU of an OAM frame, a message for operation, management and maintenance is stored. Also, an OAM frame is generated by an OAM circuit 15 provided in the IF unit 11.

In the example illustrated in FIG. 5, path protection is implemented between the transmission equipment 1A and the transmission equipment 1B. In such a case, the OAM circuit 15 provided in IF unit 11#2 of the transmission equipment 1A transmits an OAM frame toward the transmission equipment 1B. Also, the OAM circuit 15 provided in IF unit 11#x of the transmission equipment 1B transmits an OAM frame toward the transmission equipment 1A. Similarly, the OAM circuit 15 provided in IF unit 11#3 of the transmission equipment 1A transmits an OAM frame toward the transmission equipment 1B. Also, the OAM circuit 15 provided in IF unit 11#y of the transmission equipment 1B transmits an OAM frame toward the transmission equipment 1A.

The OAM circuit 15 may transmit and receive an OAM frame for each logical path. For example, the OAM circuit 15 provided in IF unit 11#2 of the transmission equipment 1A may transmit an OAM frame for monitoring a work path for data flow between the user terminals 2A and 2C and may also transmit an OAM frame for monitoring a work path for data flow between the user terminals 2B and 2D. Similarly, the OAM circuit 15 provided in IF unit 11#3 of the transmission equipment 1A may transmit an OAM frame for monitoring a protection path for data flow between the user terminals 2A and 2C and may also transmit an OAM frame for monitoring a protection path for data flow between the user terminals 2B and 2D.

The OAM circuit 15 transmits OAM frames for each logical path at time intervals specified beforehand. As an example, the OAM circuit 15 transmits OAM frames for each logical path at the intervals of 3.3 milliseconds.

The OAM circuit 15 monitors OAM frames transmitted from correspondent equipment (another transmission equipment 1 in this example) and thereby can monitor the connection state of a corresponding logical path. For example, when the OAM circuit 15 does not receive an OAM frame, the OAM circuit 15 may decide that a failure has occurred in the corresponding logical path. As an example, when the OAM circuit 15 has failed to receive three consecutive OAM frames for monitoring an arbitrary logical path, the OAM circuit 15 may decide that a failure has occurred in the corresponding logical path.

It is assumed for example that the transmission equipment 1A detects a failure in the work path for data flow between the user terminals 2A and 2C. In such a case, the transmission equipment 1A performs path switching from the work path to a protection path for data flow between the user terminals 2A and 2C. Specifically, IF unit 11#1 sets destination information of a received data packet so that the received data packet is guided to IF unit 11#3. Then, the switch 12 guides that data packet to IF unit 11#3, and IF unit 11#3 transmits that data packet to the transmission equipment 1B through a protection path.

According to multiplexing technology in recent years, a plurality of logical paths may be provided for each physical link. In such a case, when a failure has occurred in such a physical link, path switching has to be performed for the plurality of logical paths. The transmission equipment 1 according to the embodiment of the present invention is configured to perform path switching for a plurality of logical paths in a short period of time even when path switching is performed for the plurality of logical paths.

In the example illustrated in FIG. 5, 1:1 path protection is implemented. However, transmission equipment and a transition method of the embodiment of the present invention may be applied to 1+1 path protection. In 1+1 path protection, the same data is transmitted through a work path and a protection path in parallel. Transmission equipment on the reception side selects the data received through the work path or the protection path, and forwards the selected data to the destination.

In the description below, an IF unit that receives a frame from another transmission equipment or a user terminal is also referred to as an "ingress IF unit". For example, in the transmission equipment 1A, IF unit 11#1 operates as an ingress IF unit for a data flow from the user terminal 2A to the user terminal 2C. Also, an IF unit that transmits a frame to another transmission equipment or a user terminal is also referred to as an "egress IF unit". For example, in the transmission equipment 1A, IF unit 11#2 and IF unit 11#3 operate as egress IF units for a data flow from the user terminal 2A to the user terminal 2C.

Figure 6:
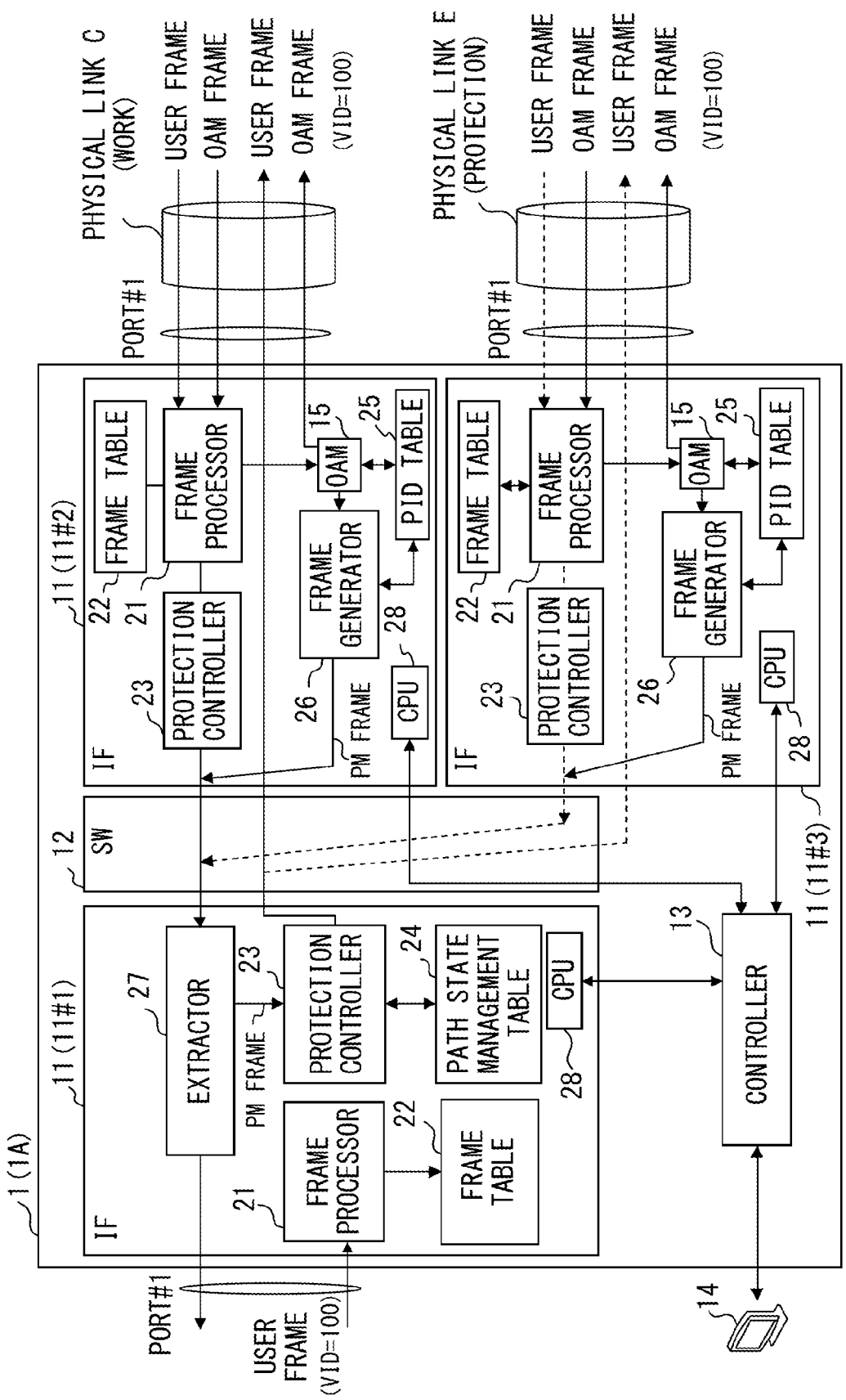
FIG. 6 is a diagram explaining a configuration and an operation of the transmission equipment.

FIG. 6 illustrates a configuration and an operation of the transmission equipment 1. Note that the transmission equipment 1 illustrated in FIG. 6 is assumed to be the transmission equipment 1A used in the transmission system illustrated in FIG. 5 in the descriptions below.

The transmission equipment 1 includes the plurality of IF units 11, the switch 12 and the controller 13 as described above. In FIG. 6, three IF units 11#1 through 11#3 are implemented in the IF unit 11 however, the transmission equipment 1 may include four or more IF units 11.

Each of the IF units 11 includes a plurality of communication ports. In this example, the transmission equipment 1 includes a pair of an input port and an output port for one correspondent equipment (another transmission equipments 1 or the user terminal 2). In other words, the transmission equipment 1 receives via the input port a frame transmitted from correspondent equipment and outputs a frame to the correspondent equipment via the output port.

Port #1 of IF unit 11#1 is connected to the user terminal 2A illustrated in FIG. 5. Accordingly, IF unit 11#1 can receive a user frame from the user terminal 2A via port #1, and can transmit a user frame to the user terminal 2A via port #1. Port #1 of IF unit 11#2 is connected to the transmission equipment 1C illustrated in FIG. 5 via physical link C. Accordingly, IF unit 11#2 can receive a frame from the transmission equipment 1C via port #1 (i.e., physical link C), and can transmit a frame to transmission equipment 1C via port #1. Similarly, port #1 of IF unit 11#3 is connected to the transmission equipment 1E illustrated in FIG. 5 via physical link E. Accordingly, IF unit 11#3 can receive a frame from the transmission equipment 1E via port #1 (i.e., physical link E), and can transmit a frame to the transmission equipment 1E via port #1. Note that by using multiplexing techniques, a plurality of logical paths can be provided in each physical link.

Hereinafter, as an example, path protection for a data flow between the user terminals 2A and 2C illustrated in FIG. 5 is described. A data flow between the user terminals 2A and 2C is assumed to belong to a virtual LAN identified by "VLANID=100". In other words, "VLANID=100" is set in the header of a frame related to a data flow between the user terminals 2A and 2C. For the sake of simplicity of description, VLANID is sometimes referred to as "VID".

A user frame transmitted from the user terminal 2A is received by IF unit 11#1 in the transmission equipment 1A. Then, the transmission equipment 1A forwards this user frame toward the transmission equipment 1B. In this process, when the work path is active, the transmission equipment 1A forwards the received user frame via IF unit 11#2. When a protection path is active, the transmission equipment 1A forwards the received user frame via IF unit 11#3.

The user frame directed to the user terminal 2A is received by IF unit 11#2 or the IF unit 11#3 in the transmission equipment 1A. In this process, when the work path is active, the user frame is received by IF unit 11#2. When a protection path is active, the user frame is received by IF unit 11#3. Then, the transmission equipment 1A transmits the user frame to the user terminal 2A by using IF unit 11#1.

Each IF unit 11 includes a received frame processor 21, a received frame table 22, a path protection controller 23, a path state management table 24, an OAM circuit 15, a PID table 25, a path management frame generator 26, a path management frame extractor 27 and a CPU 28. The received frame table 22, the path state management table 24 and the PID table 25 are implemented by for example a circuit or a semiconductor memory that can record data. The received frame processor 21, the path protection controller 23, the OAM circuit 15, the path management frame generator 26 and the path management frame extractor 27 are implemented by for example a hardware circuit although they are not limited to this example. Note that the received frame processor 21, the received frame table 22, the path protection controller 23, the OAM circuit 15, the path management frame generator 26, and the path management frame extractor 27 are described for short in FIG. 6 as FRAME PROCESSOR, FRAME TABLE, PROTECTION CONTROLLER, OAM, FRAME GENERATOR, and EXTRACTOR, respectively.

Note that FIG. 6 omits some circuits or functions in order to facilitate understanding, the IF units 11 (11#1 through 11#3) implemented in the transmission equipment 1 have substantially the same configurations. Specifically, in IF unit 11#1, the OAM circuit 15, the PID table 25 and the path management frame generator 26 are omitted. Also, in IF unit 11#2 and IF unit 11#3, the path state management table 24 and the path management frame extractor 27 are omitted.

The received frame processor 21 obtains corresponding information from the received frame table 22 by utilizing the header information in a received frame. In this example, it is assumed that a VLAN tag illustrated in FIG. 4B is added to each frame. In such a case, the received frame processor 21 obtains corresponding information from the received frame table 22 by utilizing the virtual LAN identifier (i.e., a VID) in a received frame. Note that a VID may identify a logical path belonging to a virtual LAN.

The received frame table 22 stores control information by using a VID as a search index as illustrated in FIG. 7. In other words, the received frame table 22 stores, for each VID, a VID validity flag (VID FLAG), an OAM validity flag (OAM FLAG), a destination side path protection flag (D-SIDE PROTECTION FLAG), a source side path protection flag (S-SIDE PROTECTION FLAG), a PID, first destination information and second destination information. In FIG. 7, the received frame tables 22 respectively provided in IF unit 11#1, 11#2 and 11#3 are illustrated based on the example illustrated in FIG. 6.

A VID validity flag represents whether or not a virtual LAN identified by a VID is valid. In this example, "1" represents a valid state, and "0" represents an invalid state. For example, when the VID validity flag corresponding to the VID of a received frame is "0", that received frame is discarded by the received frame processor 21.

An OAM validity flag represents whether or not to monitor a logical path by using an OAM frame. In this example, "1" represents a valid state, and "0" represents an invalid state. When, for example, the OAM validity flag corresponding to the VID of a received frame is "1" and the Ethernet type (E-TYPE) of this received frame represents OAM frame, the received frame processor 21 guides this received frame to the OAM circuit 15. In the example illustrated in FIG. 7, "OAM validity flag=0" is set for VID=100 in IF unit 11#1. In such a case, the IF unit 11#1 does not from monitor a logical path identified by VID=100 by using an OAM frame. By contrast, "OAM validity flag=1" is set for VID=100 in IF unit 11#2. In such a case, IF unit 11#2 monitors a logical path identified by VID=100 by using an OAM frame. Similarly, also IF unit 11#3 monitors a logical path identified by VID=100 by using an OAM frame.

In the example illustrated in FIG. 6, an OAM frame is transmitted between the transmission equipment 1A and the transmission equipment 1B. In such a case, the transmission equipment 1 (i.e., the transmission equipment 1C through the transmission equipment 1F) provided between the transmission equipment 1A and the transmission equipment 1B do not have to monitor an OAM frame. In the transmission equipment 1 that does not monitor an OAM frame, OAM validity flag is set to "0".

The destination side path protection flag represents whether or not path protection is implemented for a logical path on the destination side. In this example, "1" represents a state where path protection is implemented, and "0" represents a state where path protection is not implemented. Also, the source side path protection flag represents whether or not path protection is implemented for a logical path on the source side. In this example, "1" represents a state where path protection is implemented, and "0" represents a state where path protection is not implemented.

The destination side path protection flag and the source side path protection flag may be set to "1" in the transmission equipment 1 that is located at an end of a path protection section. For example, the destination side path protection flag and the source side path protection flag may be set to "1" in the transmission equipment 1A and the transmission equipment 1B. In other words, in the transmission equipment 1C, 1D, 1E and 1F, the destination side path protection flags and the source side path protection flags are set to "0". Hereinafter, by referring to FIG. 5 and FIG. 6, explanations will be given for an example of the destination side path protection flag and the source side path protection flag that are set for VID=100 in the transmission equipment 1A.

In transmission equipment 1A, the received frame processor 21 of IF unit 11#1 receives a user frame having VID=100 from the user terminal 2A. Therefore, for IF unit 11#1, the logical path on the source side is the logical path identified by VID=100 between the user terminal 2A and the transmission equipment 1A. In this situation in the example illustrated in FIG. 6, path protection is not implemented for VID=100 between the user terminal 2A and the transmission equipment 1A. Accordingly, the source side path protection flag of IF unit 11#1 is "0".

Also, when the received frame processor 21 of IF unit 11#1 receives a user frame having VID=100, IF unit 11#1 selects either a work path or a protection path and transmits that user frame. In other words, path protection is implemented for VID=100 on the destination side of IF unit 11#1. Accordingly, the destination side path protection flag of IF unit 11#1 is "1".

In the transmission equipment 1A, the work path has been configured for VID=100 on the source side of IF unit 11#2. In other words, on the source side of IF unit 11#2, one of a pair of logical paths for path protection is configured and path protection is implemented on the source side of IF unit 11#2. Also, the transmission equipment 1A is located at an end of a path protection section. Accordingly, the source side path protection flag of IF unit 11#2 is "1". Similarly, the source side path protection flag of IF unit 11#3 is also "1".

In addition, when the received frame processor 21 of IF unit 11#2 receives a user frame having VID=100, IF unit 11#2 forwards that user frame toward the user terminal 2A. In this situation, path protection is not implemented for VID=100 between the transmission equipment 1A and the user terminal 2A. Accordingly, the destination side path protection flag of IF unit 11#2 is "0". Similarly, the destination side path protection flag of IF unit 11#3 is also "0".

A PID (Protection ID) identifies a logical path pair for path protection. In other words, a PID identifies a pair of a work path and a protection path corresponding to that work path. A PID is set when a corresponding destination side path protection flag or source side path protection flag is valid. Note that a PID is used inside the transmission equipments 1. In addition, a PID may be assigned uniquely to a VID. However, one PID may be assigned to a plurality of VIDs.

First destination information and second destination information respectively specify the IF unit 11 and an output port for transmitting a user frame. When a corresponding destination side path protection flag is valid, both first destination information and second destination information are set. In other words, when path protection is implemented on the destination side, both first destination information and second destination information are set. In such a case, first destination information and second destination information correspond to for example a work path and a protection path, respectively. When a corresponding destination side path protection flag is invalid, only first destination information is set.

When the received frame processor 21 receives a frame, the received frame processor 21 obtains information corresponding to the VID of that received frame from the received frame table 22. Hereinafter, this information may be referred to as "received frame table information". Then, the received frame processor 21 transfers the received frame and the obtained received frame table information to the path protection controller 23. However, when the received frame is an OAM frame, the received frame processor 21 transfers that OAM frame and obtained received frame table information to the OAM circuit 15.

The path protection controller 23 determines a destination of the received frame based on the received frame table information. However, when the destination side path protection flag in the received frame table information is valid, the path protection controller 23 obtains corresponding information from the path state management table 24 by using as a search index the PID included in the received frame table information. Hereinafter, this information may be referred to as "path state management table information". Then, the path protection controller 23 determines a destination of the received frame based on the received frame table information and the path state management table information.

The path state management table 24 stores management information (i.e., path state management table information) for each logical path pair by using a PID as a search index. A configuration of the path state management table 24 and a method of generating the path state management table 24 will be explained later.

The OAM circuit 15 terminates an OAM frame. By so doing, the OAM circuit 15 monitors a connection state of a corresponding logical path based on a reception status of an OAM frame. For example, when an OAM frame has been received within a specified period of time (for example, ten milliseconds), the OAM circuit 15 may decide that the corresponding logical path is normal. Thereafter, the OAM circuit 15 writes a result of monitoring a logical path to the PID table 25. Also, the OAM circuit 15 generates OAM frames periodically and transmits them to correspondent equipment. As an example, OAM frames are generated at the intervals of 3.3 milliseconds.

The PID table 25 stores path information for managing each logical path pair by using a PID as a search index. Hereinafter, this information may be referred to as "PID table information". A configuration of the PID table 25 and a method of generating the PID table 25 will be explained later.

The path management frame generator 26 periodically generates a path management frame ("PM FRAME" in FIG. 6) and transmits the path management frame to another IF unit 11. For this process, the path management frame generator 26 reads PID table information from the PID table 25 and stores that PID table information in the payload of the path management frame. Thereafter, the path management frame generator 26 transmits the path management frame to all the other IF units 11 in the transmission equipment 1. Alternatively, the path management frame generator 26 may transmit the path management frame to specified one or a plurality of the IF units 11.

The path management frame extractor 27 extracts a path management frame from among frames guided from the switch 12. The extracted path management frame is guided to the path protection controller 23. Frames other than a path management frame (a user frame for example) are guided to the output port of the IF unit 11 without being extracted by the path management frame extractor 27.

The CPU 28 may control the respective elements of the IF unit 11 based on an instruction from the controller 13. Information stored in the received frame table 22 is given to the CPU 28 for example from the control terminal 14 via the controller 13. In such a case, the CPU 28 stores that information in the received frame table 22. Also, the CPU 28 may monitor states of the respective elements of the IF unit 11 so as to report results of the monitoring to the control terminal 14 via the controller 13.

FIG. 8 illustrates a data structure of the PID table 25. The PID table 25 stores PID table information for each PID as described above. In this example, PID table information represents a state of a logical path pair identified by a PID. The state of each logical path pair is represented by one-byte information (B7 through B0).

Hereinafter, by referring to FIGS. 9A-9D in addition to FIG. 8, explanations will be given for each of bits B7-B0 of PID table information. FIG. 9A and FIG. 9B illustrate the PID table 25 provided in IF unit 11#2 illustrated in FIG. 6. FIG. 9C and FIG. 9D illustrate a PID table 25 provided in IF unit 11#3 illustrated in FIG. 6. In this example, it is assumed that PID=5 corresponds to VID=100 as illustrated in FIG. 7. In other words, IF unit 11#2 accommodates the work path of the logical path pair identified by PID=5, and IF unit 11#3 accommodates the protection path of the logical path pair identified by PID=5.

Bit B7 represents whether or not the work path is valid. For example, IF unit 11#2 accommodates the work path corresponding to PID=5 and accordingly B7=1 is set as illustrated in FIG. 9A and FIG. 9B. By contrast, since IF unit 11#3 does not accommodate the work path corresponding to PID=5, B7=0 is set as illustrated in FIG. 9C and FIG. 9D.

Bit B5 represents whether or not the protection path is valid. For example, IF unit 11#2 does not accommodate the protection path corresponding to PID=5 and accordingly B5=0 is set as illustrated in FIG. 9A and FIG. 9B. By contrast, since IF unit 11#3 accommodates the protection path corresponding to PID=5, B5=1 is set as illustrated in FIG. 9C and FIG. 9D.

Bit B7 and bit B5 on the PID table 25 are set by software. For example, bit B7 and bit B5 on the PID table 25 are set by the control terminal 14, the controller 13 and CPU 28 when a configuration of path protection is specified.

Bit B6 represents a state of a work path when that work path is valid. In this example, when a work path is normal, "0" is written to bit B6. When a failure has been detected in a work path, "1" is written to bit B6. When, for example, a failure is detected in the work path corresponding to PID=5, bit B6 is rewritten from "0" to "1" on the PID table 25 of IF unit 11#2 that accommodates the work path. However, IF unit 11#3 does not accommodate the work path corresponding to PID=5. Accordingly, when the failure occurs in this work path, bit B6 on the PID table 25 of IF unit 11#3 is not rewritten, as illustrated in FIG. 9C and FIG. 9D Bit B4 represents a state of a protection path when that protection path is valid. In this example, when a protection path is normal, "0" is written to bit B4. When a failure has been detected in a protection path, "1" is written to bit B4.

Bits B6 and B4 on the PID table 25 are updated by the OAM circuit 15. In other words, the OAM circuit 15 monitors a state of a work path and/or a protection path based on a reception status of an OAM frame. In this example, when the OAM circuit 15 receives an OAM frame via a logical path, the OAM circuit 15 decides that logical path is normal. Accordingly, when a work path is normal, the OAM circuit 15 writes "0 (normal)" to bit B6 in the corresponding record. Similarly, when a protection path is normal, the OAM circuit 15 writes "0 (normal)" to bit B4 in the corresponding record.

When the OAM circuit 15 continues to fail to receive an OAM frame via a logical path for a specified period of time, it is decided that a failure has occurred in that logical path. As an example, the OAM circuit 15 decides that a failure has occurred. In such a case, when a failure is detected in a work path, the OAM circuit 15 writes "1 (failure)" to bit B6 in the corresponding record. Similarly, when a failure is detected in a protection path, the OAM circuit 15 writes "1 (failure)" to bit B4 in the corresponding record. However, operations of updating bit B6 or B4 from "0" to "1" does not have to be performed by the OAM circuit 15. For example, it is also possible to automatically perform updating from "0" to "1" by using a hardware circuit when a specified period of time has elapsed since "0" has been written to bit B6 or B4.

Bit B3 represents whether or not to perform forced path selection. Forced path selection is an operation mode in which a frame is transmitted through a logical path that is specified in advance regardless of whether a failure has occurred in a work path. In this example, when bit 3B has been set to "1 (valid)", a logical path specified by bit B2 is selected.

When bit B3 has been set to "1 (valid)", bit B2 specifies a logical path to be used for transmitting a frame. In this example, when "0" has been set in bit B2, the IF unit 11 and a port number represented by the first destination information are used. When "1" has been set in bit B2, the IF unit 11 and a port number represented by the second destination information is used. Bits B3 and B2 are set by software. Bits B1 and B0 are reservation bits. In other words, bit B1 or B0 is not used in this example.

FIG. 10A and FIG. 10B illustrate examples of the path state management table 24. FIG. 10A and FIG. 10B illustrate, as examples, the path state management table 24 provided in IF unit 11#1.

A data structure of the path state management table 24 is substantially the same as that of the PID table 25. The path state management table 24 is updated by information stored in the PID table 25 (i.e., the PID table information) stored in the PID table 25 of IF unit 11. In the example illustrated in FIG. 6, the path state management table 24 of IF unit 11#1 is updated by the PID table information stored the PID tables 25 of IF unit 11#2 and IF unit 11#3.

PID table information stored in the PID table 25 is periodically read by the path management frame generator 26 and is transmitted to another IF unit 11 by using a path management frame. A path management frame is extracted by the path management frame extractor 27 and is guided to the path protection controller 23. Then, the path protection controller 23 updates the path state management table 24 based on the PID table information stored in the path management frame.

For a record in which "1" is set in bit B7 in the PID table information, bits B7 and B6 in the corresponding record are updated in the path state management table 24. Similarly, for a record in which "1" is set in bit B5 in the PID table information, bits B5 and B4 in the corresponding record are updated in the path state management table 24.

It is assumed for example that when the work path corresponding to PID=5 is normal, the PID table information illustrated in FIG. 9A is transmitted from IF unit 11#2 to IF unit 11#1, and the PID table information illustrated in FIG. 9C is transmitted from IF unit 11#3 to IF unit 11#1. In such a case, bit B7 in the PID table information illustrated in FIG. 9A is "1". Accordingly, bits B7 and B6 in the path state management table 24 are updated in accordance with this PID table information. Specifically, "B7=1" and "B6=0" are written in the path state management table 24 as illustrated in FIG. 10A. Also, bit B5 in the PID table information illustrated in FIG. 9C is "1". Accordingly, bits B5 and B4 in the path state management table 24 are updated in accordance with this PID table information. Specifically, as illustrated in FIG. 10A, "B5=1" and "B4=0" are written in the path state management table 24.

Thereafter, when a failure is detected in the work path corresponding to PID=5, the PID tables 25 of IF unit 11#2 and IF unit 11#3 are updated to the states illustrated in FIG. 9B and FIG. 9D, respectively. It is assumed that the PID table information illustrated in FIG. 9C is then transmitted from IF unit 11#2 to IF unit 11#1, and the PID table information illustrated in FIG. 9D is then transmitted from IF unit 11#3 to IF unit 11#1. In such a case, bit B7 in the PID table information illustrated in FIG. 9C is "1". Accordingly, bits B7 and B6 in the path state management table 24 are updated in accordance with this PID table information. Specifically, as illustrated in FIG. 10B, "B7=1" and "B6=1" are written in the path state management table 24. Also, bit B5 in the PID table information illustrated in FIG. 9D is "1". Accordingly, bits B5 and B4 in the path state management table 24 are updated in accordance with this PID table information. Specifically, as illustrated in FIG. 10B, "B5=1" and "B4=0" are written in the path state management table 24.

As described above, in the transmission equipment 1 according to the embodiment, the egress IF unit (11#2, 11#3) monitors a state of corresponding logical path (work path or protection path). Also the egress IF unit stores, based on results of this monitoring, path information representing a state of the logical path for each logical path pair in the PID table 25. Further, the egress IF unit transmits information stored in the PID table 25 to the ingress IF unit (11#1). Then, the ingress IF unit stores in the path state management table 24 the path information received from the egress IF unit. Accordingly, the ingress IF unit can recognize a state of each logical path accommodated in each egress IF unit. Thereafter, the ingress IF unit selects a work path or a protection path by using this path information and guides the received frame to the selected path.

In the above configuration, path information regarding each logical path collected by an egress IF unit is transmitted to an ingress IF unit using a path management frame. Hereinafter, a frame transmitted inside the transmission equipment 1 will be explained.

Figure 11A:
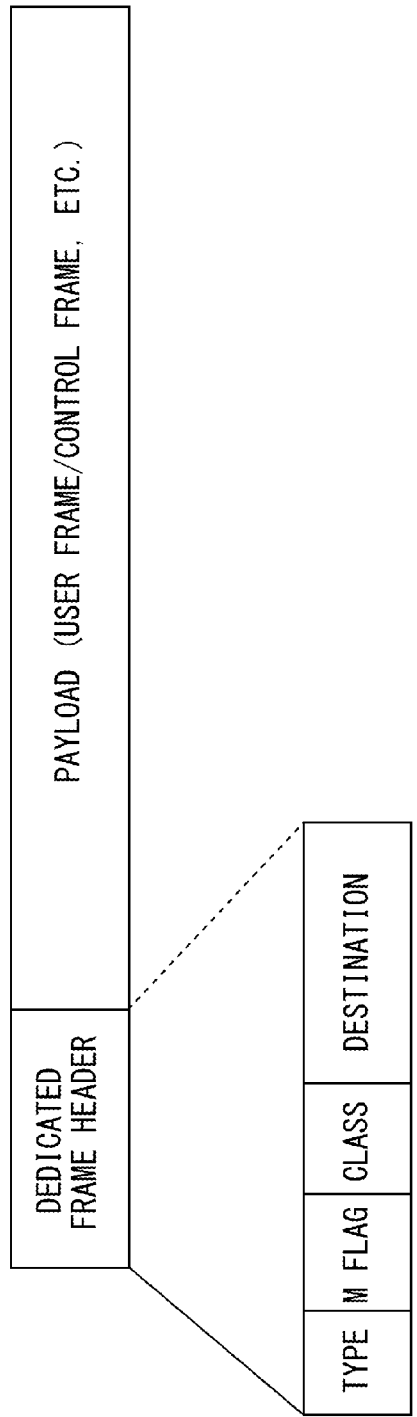
FIGS. 11A and 11B illustrate formats of frames transmitted inside the transmission equipment.
Figure 11B:
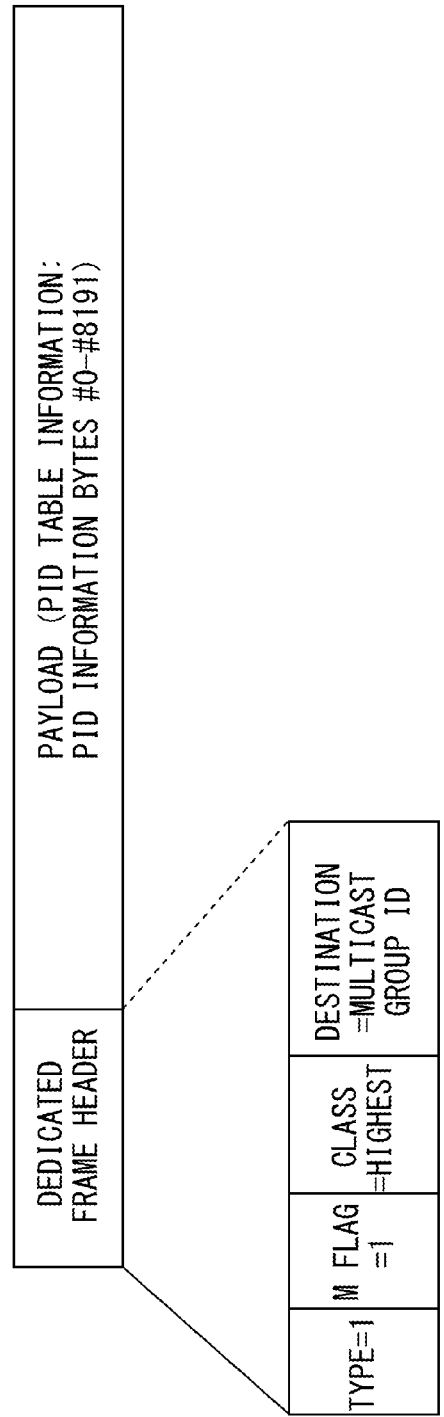

FIGS. 11A and 11B illustrate formats of frames transmitted inside the transmission equipment 1. A frame transmitted inside the transmission equipment 1 has a dedicated frame header and a payload as illustrated in FIG. 11A.

When a received user frame is transmitted inside the transmission equipment 1, the received frame processor 21 stores that user frame entirely in the payload of the frame illustrated in FIG. 11A. Further, the received frame processor 21 adds a dedicated frame header to that payload.

FIG. 11B illustrates a format of a path management frame. A format of a path management frame is substantially the same as that of a user frame etc. transmitted inside the transmission equipment 1. However, information extracted from the PID table 25 is stored in the payload of a path management frame.

The dedicated frame header includes Type, an M flag, Class and destination information. Type represents a type of a frame processed in the transmission equipment 1. In this example, type 0 is assigned to a user frame and type 1 is assigned to a path management frame.

An M flag represents whether or not to perform multicasting. In this example, M flag=0 is assigned to unicast and M flag=1 is assigned to multicast. In unicast, one destination (IF unit 11 and output port) is given to a received frame, while in multicast, a plurality of destinations are given to a received frame. "1 (multicast)" is given to a path management frame. Note that in multicast, a frame may be copied by the switch 12.

Class represents priorities of a frame. As an example, priorities of a frame are represented by eight classes. When congestion occurs, the switch 12 discards a frame with a low priority. In this situation, the Class with the highest priority is given to a path management frame so that a path management frame is not discarded easily by the switch 12. Accordingly, path information representing a state of a logical path is transmitted from an egress IF unit to an ingress IF unit reliably.

For a user frame to which a VLAN tag has been added, the priority in the VLAN tag may also be set as the Class of the dedicated frame header as it is. Alternatively, the priority in a VLAN tag may also be converted in accordance with a specified rule so as to be set as the Class of the dedicated frame header. This rule may be generated so that for example the Class of the highest priority is not given to a user frame. In such a case, since the priority of a path management frame is always higher than that of a user frame, it becomes further difficult for the switch 12 to discard a path management frame. However, in such a case, a conversion table is needed for converting a priority in a VLAN tag into the Class of the dedicated frame header. For a user frame to which a VLAN tag is not given, for example a destination MAC address and/or a source MAC address are/is converted into the Class.

Destination information represents the destination of a frame. In unicast, for example one destination IF unit and one output port are specified. In multicast, a multicast ID is specified. A multicast ID specifies a plurality of pairs of IF unit and a port number. In such a case, the switch 12 identifies a plurality of destination IF units and a plurality of output ports based on a multicast ID. Then, the switch 12 transfers a frame to the plurality of identified destinations.

The dedicated frame header of a user frame is removed for example in an egress IF unit. A path management frame is extracted in an IF unit in a destination by the path management frame extractor 27, and is terminated by the path protection controller 23. In other words, a path management frame is not output to the external environment of the transmission equipment 1.

Next, explanations will be given for operations of the transmission equipment 1 by referring to FIG. 5 through FIG. 10B. It is assumed in this example that path protection is implemented for a virtual LAN that is identified by VID=100. Also, operations are described in which a user frame is transmitted from IF unit 11#1 via IF unit 11#2 or 11#3. In other words, IF unit 11#1 operates as an ingress IF unit and IF units 11#2 and 11#3 operate as egress IF units respectively. Note that a frame related to a virtual LAN identified by VID=100 is sometimes referred to as a "frame (VID=100)".

<Egress IF Unit>

(1) The received frame processor 21 of IF unit 11#2 receives an OAM frame (VID=100) for monitoring a logical path that corresponds to VID=100 from a correspondent equipment. Then, the received frame processor 21 reads corresponding information by using VID=100 as a search index from the received frame table 22 illustrated in FIG. 7. In other words, the received frame processor 21 obtains received frame table information corresponding to VID=100 from the received frame table 22. In this example, the OAM validity flag is "1 (valid)" and the source side path protection flag is "1 (valid)". In such a case, the received frame processor 21 transfers the received OAM frame to the OAM circuit 15. Also, the received frame processor 21 reports to the OAM circuit 15 the PID included in the received frame table information. In this example, the PID is "5".

(2) In IF unit 11#2, when the OAM circuit 15 receives the OAM frame, the OAM circuit 15 accesses the PID table 25 by using the PID corresponding to that OAM frame as a search index. In this example, the PID table 25 is accessed by using PID=5 as a search index. In this case, bit B7 is "1 (work path: valid)" in the PID table 25 of IF unit 11#2 as illustrated in FIG. 9A. In other words, IF unit 11#2 accommodates the work path for the virtual LAN that is identified by VID=100. In such a case, the OAM circuit 15 writes "0 (work path: normal) to bit B6.

(3) On the PID table 25, bit B6 of the record in which "1 (work path: valid)" is set in bit B7 is updated automatically to "1 (work path: failure)" when a specified period of time has elapsed since "0" was written by the OAM circuit 15. This specified period of time is for example three times the transmission interval of OAM frames (approximately 10 milliseconds). In such a case, when three OAM frames have failed to be received continuously, it is decided that a failure has occurred in a logical path. On the other hand, when the OAM circuit 15 receives the next OAM frame before the specified period of time elapses, bit B6 remains "0 (work path: normal)".

(4) The process of IF unit 11#3 is substantially the same as that of IF unit 11#2 described above. However, IF unit 11#3 accommodates a protection path of the virtual LAN identified by VID=100. Accordingly, in IF unit 11#3, when an OAM frame (VID=100) is received, "0 (protection path: normal)" is written to bit B4 of the corresponding record. On the other hand, when an OAM frame (VID=100) is not received, bit B4 is updated to "1 (protection path: failure).

(5) In IF units 11#2 and 11#3, the path management frame generator 26 reads information from all records in the PID table 25 periodically (for example in the cycle of 10 milliseconds). The path management frame generator 26 stores the information read from the PID table 25 in the payload of the path management frame illustrated in FIG. 11B. Then, the path management frame generator 26 transmits a generated path management frame to all of the other IF units 11 in the transmission equipment 1. This path management frame is transmitted to the destination IF unit by the switch 12 similarly to a user frame without being processed by the CPU. In other words, a path management frame including PID table information is transmitted not via a control plane (inter-CPU bus) but via a data plane (a high speed data communication path). In this situation, as illustrated in FIG. 11B, the Class of a path management frame represents the highest priority, and accordingly, a path management frame is not discarded easily in the switch 12. Note that a path management frame does not have to be transmitted to all of the other IF units 11. In other words, it is also possible for the path management frame generator 26 to transmit a path management frame to some of the IF units 11.

As described above, path information collected by each egress IF unit is periodically transmitted to another IF unit using a path management frame. Here, a bandwidth needed for transmitting a path management frame is calculated. In the example below, it is assumed that the transmission equipment 1 provides 8192 sets of path protection. In such a case, the PID table 25 has records for PIDs #0 through #8191. Thus, the volume of the PID table 25 is 8192 bytes. Also, it is assumed that the dedicated frame header illustrated in FIG. 11A or FIG. 11B is of 4 bytes. In such a case, a path management frame is expressed by the length of 8196 bytes. Further, it is assumed that the path management frame generator 26 generates and transmits path management frames at the intervals of 10 milliseconds. Therefore, a bandwidth needed for each IF unit 11 to transmit path management frames is calculated by an equation below.

Bandwidth=8196×8×100=6,556,800 bps

The bandwidth needed for transmitting path management frames is approximately 6.6 Mbps. A bandwidth of the switch 12 is for example in the order of 100 Gbps. In other words, a bandwidth needed for transmitting path management frames is sufficiently smaller than a bandwidth of the switch 12. Accordingly, transmission delay of a user frame is not caused even when path management frames are transmitted via the switch 12.

<Ingress IF Unit>

(1) IF unit 11#1 receives a path management frame via the switch 12. In this example, IF unit 11#1 periodically receives path management frames from IF units 11#2 and 11#3 respectively. Then, the path management frame extractor 27 extracts a path management frame from the received frames and guides the extracted frame to the path protection controller 23. When a received frame is a user frame, the path management frame extractor 27 guides that user frame to the output port.

(2) The path protection controller 23 updates the path state management table 24 based on path management frames received from the respective IF units (11#2 and 11#3). The path state management table 24 is updated for each PID as described below.

(3) When bit B7 is "1 (work path: valid)", it is decided that the work path state information stored in a path management frame is valid. In such a case, bit B7 and bit B6 in the path state management table 24 are updated by bit B7 and bit B6 stored in a path management frame. For example, it is assumed that the path state management table 24 of IF unit 11#1 stores information illustrated in FIG. 10A. It is also assumed that IF unit 11#1 receives the PID table information illustrated in FIG. 9B from IF unit 11#2. At this moment, in the PID table information, bit B7 corresponding to PID=5 is assumed to be "1". Accordingly, in the path state management table 24, bit B7 and bit B6 in the record corresponding to PID=5 are updated by bit B7 and bit B6 in the received PID table information. As a result of this, bit B6 is changed from "0 (work path: normal)" to "1 (work path: failure)".

(4) When bit B5 is "1 (protection path: valid)", it is decided that the protection path state information stored in a path management frame is valid. In such a case, bit B5 and bit B4 in the path state management table 24 are updated by bit B5 and bit B4 stored in the path management frame.

(5) For a PID for which both bit B7 and bit B5 in a received path management frame are "0 (invalid)", the update of the path state management table 24 is not performed. Also, when both bit B7 and bit B5 in a received path management frame are "1 (valid)", an error message for example may be output.

As described above, the path state management table 24 of an ingress IF unit is updated by path management frames that are transmitted periodically from respective egress IF unit. Accordingly, the path state management table 24 stores information representing the latest state of each logical path. The path state management table 24 stores information representing states of a work path and a protection path for each logical path pair of path protection. Accordingly, an ingress IF unit can appropriately select a logical path through which a received user frame is to be output by referring to the path state management table 24.

<Path Switching>

When IF unit 11#1 receives a user frame from a network, IF unit 11#1 determines a logical path through which that user frame is to be output. In other words, IF unit 11#1 determines an IF unit and an output port for outputting a received user frame. Hereinafter, explanations will be given for a method of determining a logical path for outputting a received user frame.

The received frame processor 21 reads corresponding received frame table information from the received frame table 22 by using the VID of a received frame as an index. For example, received frame table information (IF unit 11#1) illustrated in FIG. 7 is read with respect to VID=100. Then, the received frame processor 21 transfer the received frame to the path protection controller 23 and also gives to the path protection controller 23 the frame table information read from the received frame table 22.

Figure 12:
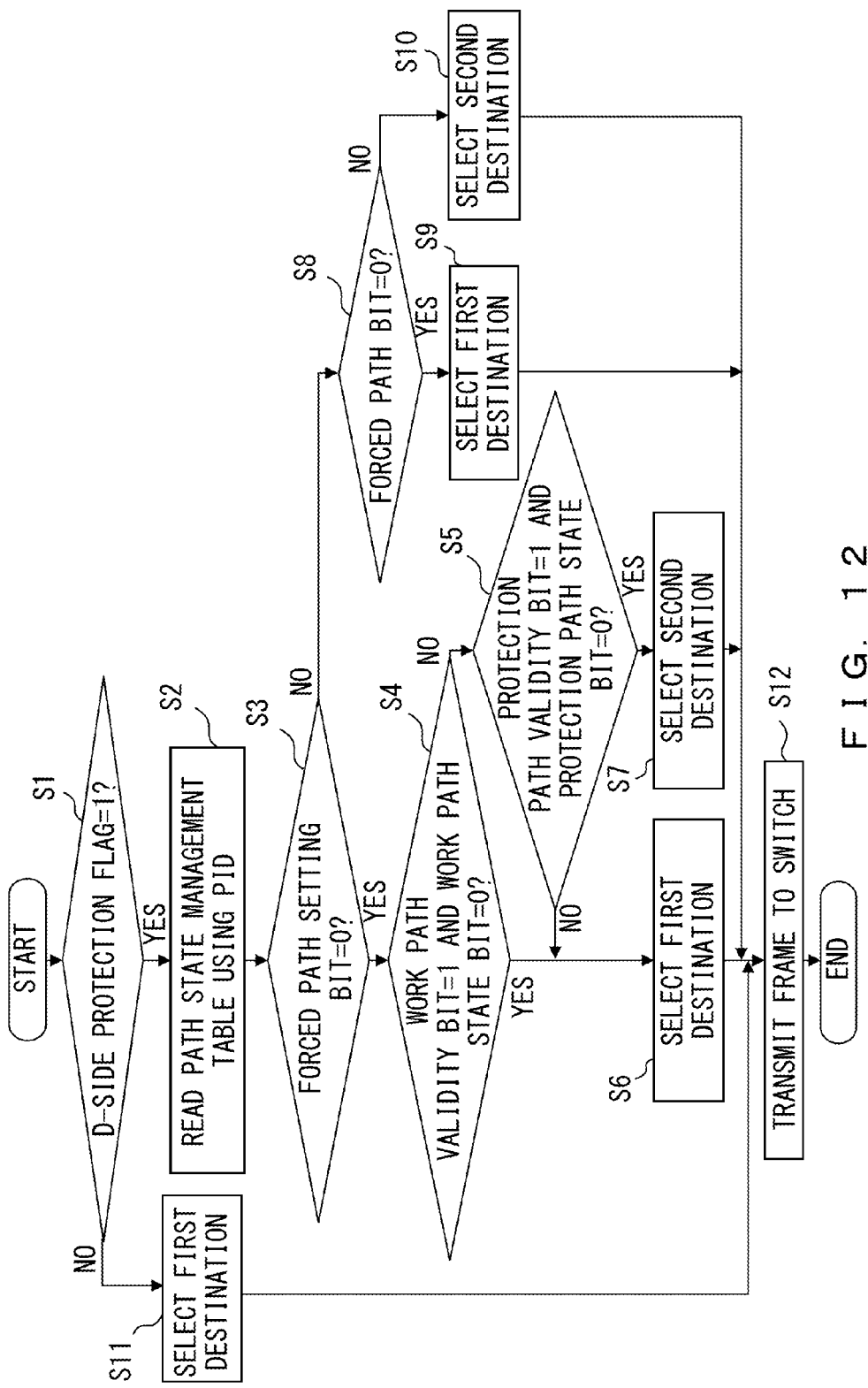
FIG. 12 is a flowchart explaining operations of a path protection controller.

FIG. 12 is a flowchart illustrating operations of the path protection controller 23. The process of this flowchart is executed when the path protection controller 23 has received a frame and corresponding received frame table information from the received frame processor 21.

In S1, the path protection controller 23 checks the value of the destination side path protection flag in the received frame table information. When the destination side path protection flag is "1", it is decided that IF unit 11#1 is the starting point of path protection, and the process of the path protection controller 23 proceeds to S2. When the destination side path protection flag is "0", the process of the path protection controller 23 proceeds to S11.

In S2, the path protection controller 23 obtains corresponding path state management table information from the path state management table 24 by using the PID in the received frame table information as a search index. When PID=5, the path protection controller 23 obtains information bits B7-B0 as illustrated in FIG. 10A or FIG. 10B.

In S3, the path protection controller 23 checks the value of the forced path setting bit in the path state management table information. Specifically, bit B3 is checked. When the forced path setting bit is "0 (invalid)", the process of the path protection controller 23 proceeds to S4. When the forced path setting bit is "1 (valid)", the process of the path protection controller 23 proceeds to S8.

In S4, the path protection controller 23 checks the value of the work path validity bit and the work path state bit in the path state management table information. Specifically, bit B7 and bit B6 are checked. When the work path validity bit is "1 (work path: valid)" and the work path state bit is "0 (work path: normal)", the process of the path protection controller 23 proceeds to S6. In the other cases, the process of the path protection controller 23 proceeds to S5.

When the work path is valid and that work path is normal, the path protection controller 23 stores, in "destination information" of the dedicated frame header, the first destination information in the received frame table information. The first destination information specifies the IF unit 11 and the output port corresponding to the work path as explained by referring to FIG. 7.

When the work path is not valid or when a failure has occurred in that work path, the process in S5 is executed. In S5, the path protection controller 23 checks the values of the protection path validity bit and the protection path state bit in the path state management table. In other words, bit B5 and bit B4 are checked. When the protection path validity bit is "1 (protection path: valid)" and the protection path state bit is "0 (protection path: normal)", the process of the path protection controller 23 proceeds to S7.

In S7, the path protection controller 23 stores, in "destination information" of the dedicated frame header, the second destination information in the received frame table information. The second destination information specifies the IF unit 11 and the output port corresponding to the protection path as explained by referring to FIG. 7.

When the decision in S5 is "NO", the process in S6 is executed in the example illustrated in FIG. 12. A situation when the decision in S5 is "NO" may occur for example in cases, among other cases, where failures have occurred in both a work path and a protection path or where a work path/protection path has been wrongfully set. Accordingly, when the decision in S5 is "NO", IF unit 11#1 may stop the transmission of frames.

When the forced path setting bit is "1 (valid)", S8-S10 are executed. In S8, the path protection controller 23 checks the value of the forced path bit in the path state management table information. Specifically, bit B2 is checked. When the forced path bit is "0", the path protection controller 23 stores, in "destination information" of the dedicated frame header, the first destination information in the received frame table information. When the forced path bit is "1", the path protection controller 23 stores, in "destination information" of the dedicated frame header, the second destination information in the received frame table information. As described above, when the forced path setting bit is "1 (valid)", a specified logical path is used regardless of the state of a work path/protection path. Forced path setting is implemented for example in a maintenance operation of a transmission system.

When the destination side path protection flag is "0" (S1: NO), the process in S11 is executed. When the destination side path protection flag is "0", as explained by referring to FIG. 7, the received frame table information includes first destination information but does not include second destination information. Accordingly, in S11, the path protection controller 23 stores first destination information in "destination information" of the dedicated frame header.

In S12, the path protection controller 23 transmits to the switch 12 a frame to which destination information has been given in S6, S7, S9, S10 or S11. By so doing, the switch 12 transfers the received frame in accordance with that destination information. As a result of this, the received frame is transmitted via the output port of the IF unit specified by first destination information or second destination information.

As described above, in the transmission equipment or the transmission method according to the embodiment, a state of a logical path pair (work path and protection path) belonging to each path protection is managed by using an identifier (PID) for managing each path protection. During this managing, path information representing states of paths in association with PIDs is collected in respective egress IF unit that terminates a work path and a protection path, respectively. The egress IF unit periodically transmits collected path information to other IF units in multicast transmission using a path management frame. These operations may be implemented by a hardware circuit. The path management frame is transmitted to other IF units by using a high-speed data bus (the switch 12 in the example) for transferring a user frame. Accordingly, an ingress IF unit can manage the latest states of logical paths (work path and protection path) related to the transmission of a received frame for each PID.

In other words, the transmission equipment 1 can appropriately transmit a received frame based on the latest states of logical paths (work path and protection path) related to the transmission of that received frame. Also, when a failure occurs in a work path, switching to a protection path is implemented rapidly based on information representing the latest state that is managed for each PID.

<Effect According to Embodiment>

Hereinafter, a configuration according to the embodiment will be compared with two related techniques.

The first related technique is path protection based on the transmission equipment illustrated in FIG. 1. In the transmission equipment 1000A illustrated in FIG. 1, a received OAM frame (monitoring packet in the example of FIG. 1) is guided to ingress IF unit #1 via egress IF unit #6 and a monitoring unit. During this operation, this OAM frame is guided to the CPU of ingress IF unit #1 via the CPU of egress IF unit #6 and the CPU of the monitoring unit. Then, the CPU of the ingress IF unit #1 determines a destination of the frame based on the OAM frame by means of software processing.

In this example, when a plurality of logical paths are multiplexed in one physical link and a failure has occurred in that physical link, path switching has to be performed for the plurality of logical paths. However, in the configuration illustrated in FIG. 1, path switching processes for the plurality of logical paths are sequentially executed by software. It is assumed as an example that the software processing time needed for performing switching for one logical path is 100μ seconds and that 2000 logical paths are multiplexed in the physical line in which the failure has occurred. In such a case, approximately 200 milliseconds is needed to perform switching for all of the logical paths.

Also, CPUs execute not only path switching processes but also other processes in parallel. Accordingly, the processing time needed for performing path switching may vary depending upon operation amounts for other processes. In other words, it is difficult to ensure a stabile path switching processing time.

By contrast, in a configuration of the embodiment, the monitoring of a path state, reports from an egress IF unit to an ingress IF unit and path switching processes may be implemented by a hardware circuit without using a CPU. Accordingly, even when a plurality of logical paths multiplexed in a physical link are to be collectively switched, the processing time for this switching is short and stable.

When for example the period of 10 milliseconds continues without receiving an OAM frame for a logical path, path information representing "failure" is automatically written for that logical path on the PID table 25. Accordingly, when for example, a physical link in which a plurality of logical paths are multiplexed is disconnected, path information representing "failure" is written to each of the plurality of logical paths 10 milliseconds after the disconnection. Also, an egress IF unit transmits path information representing a state of each logical path to an ingress IF unit periodically (for example in the cycle of 10 milliseconds). Accordingly, in this example, it is possible to complete the switching from a work path to a protection path for all logical paths approximately 20 milliseconds after disconnection of a physical link.

Figure 13:
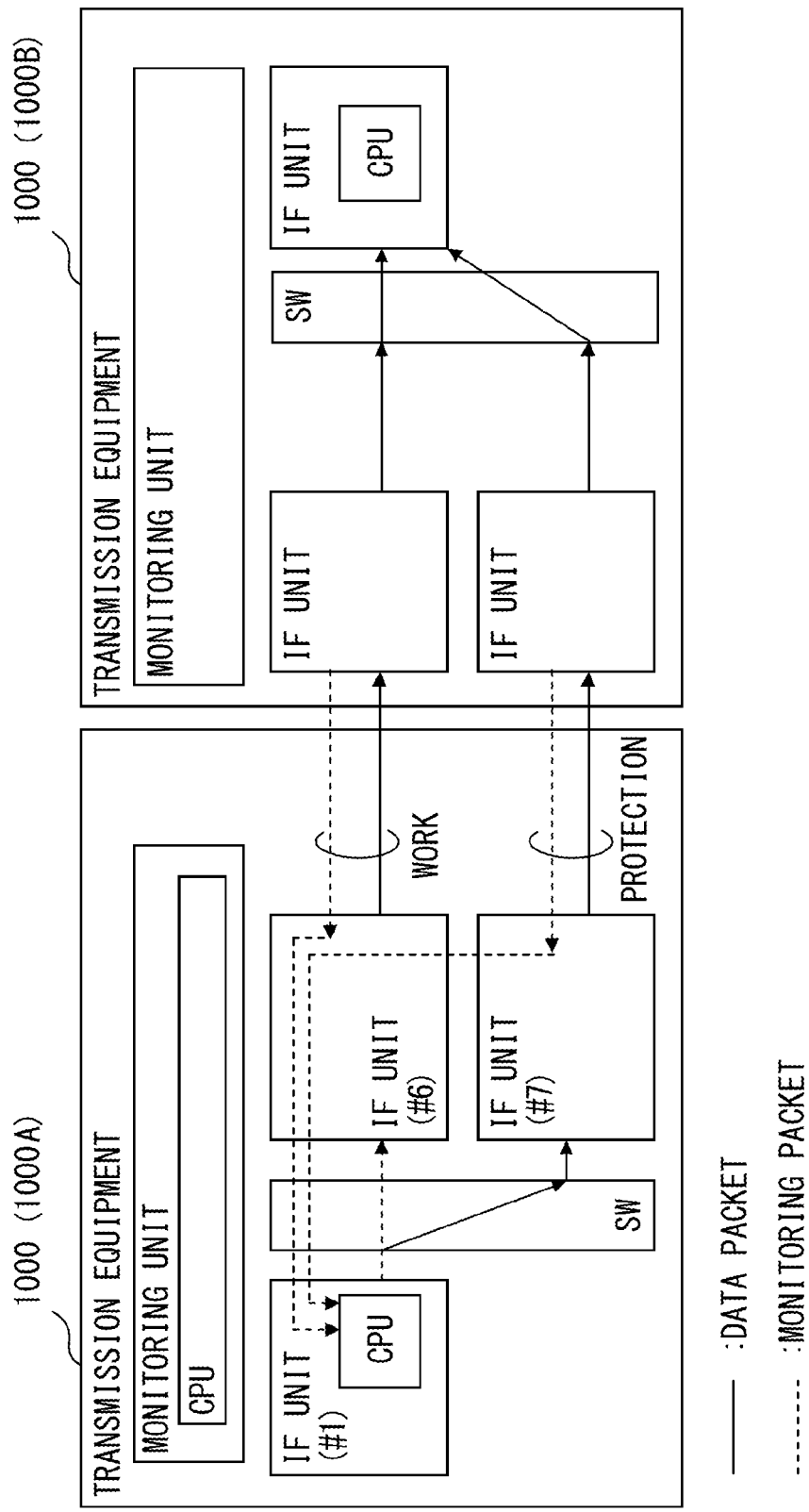
FIG. 13 illustrates an operation of transmission equipment according to a second related technique.

In the second related technique, as illustrated in FIG. 13, egress IF unit #6 transfers a received OAM frame to ingress IF unit #1 without passing through a monitoring unit. According to this configuration, the disadvantage caused by the software processing of the first related technique is mitigated.

However, according to this configuration, there is a possibility of congestion in a switch because all OAM frames are transferred by the switch (SW in FIG. 13). For example, it is assumed that each IF unit accommodates 8192 protection paths (work paths and protection paths). In such a case, IF units terminate 16384 OAM frames. Also, according to ITU-TY.1731, the length of an OAM frame is 97 bytes. In this situation, it is assumed that OAM frames are transmitted at the intervals of 3.3 milliseconds. Then, the bandwidth for transferring OAM frames in transmission equipment is expressed by the equation below.

$$\text{Bandwidth}=16384\times97\times8\times300=\text{approximately } 3.8 \text{ Gbps}$$

By contrast, in a configuration of the embodiment, an OAM frame is terminated in an egress IF unit. Also, one-byte path information is transmitted from an egress IF unit to an ingress IF unit for each path protection. In such a case, a bandwidth needed for transmitting path information in transmission equipment is approximately 6.6 Mbps as described above. Thus, according to a configuration of the embodiment, the bandwidth for user frames is barely effected by transfer of path information.

When the number of protection paths accommodated by the transmission equipment 1 increases, the number of records in the path state management table 24 and the PID table 25 increases and the bandwidth for transferring a path management frame also becomes broader. However, it is easy to enlarge the sizes of tables. Also, the bandwidth for transferring a path management frame is so narrow in comparison with the bandwidth of the switch 12, thus it can be ignored. Further, an increase in the number of protection paths does not increase a processing amount by a CPU in transmission equipment. Accordingly, it is possible to easily increase the number of protection paths while maintaining the path switching performance in response to a failure, making it possible to provide a highly-expandable protection path switching architecture.

<Another Embodiment>

The transmission equipment and the transmission method according to the embodiment illustrated in FIGS. 5-12 are applied to 1:1 protection. In 1:1 protection in this example, the transmission equipment at the transmission end of path protection transmits a user frame through one of the work path and the protection path.

Transmission equipment or a transmission method according to another embodiment is applied to 1+1 protection. In 1+1 protection, the transmission equipment at the transmission end of path protection transmits identical user frames in parallel through the work path and the protection path. The transmission equipment at the reception end of path protection selects one of the user frame received through the work path and the user frame received through the protection path, and transmits the selected user frame to a destination.

As an example, it is assumed that in the transmission equipment (transmission equipment 1B illustrated in FIG. 5 for example) at the reception end of path protection, IF unit 11#x receives a user frame and an OAM frame through the work path and IF unit 11#y receives a user frame and an OAM frame through the protection path. In this frame transfer, IF units 11#x and 11#y respectively operate as ingress IF units.

User frames received by IF units 11#x and 11#y are guided to an egress IF unit (for example IF unit 11#z illustrated in FIG. 5) by the switch 12. In addition, IF units 11#x and 11#y respectively collect path information representing corresponding logical paths based on reception states of GAM frames. Further, the path information collected by IF units 11#x and 11#y is periodically reported to IF unit 11#z by using path management frames. IF unit 11#z selects one of the user frame received by IF unit 11#x and the user frame received by IF unit 11#y based on the path information reported from the egress IF unit, and transfers the selected user frame to a client.

As described above, according to another embodiment, path information collected by each ingress IF unit is reported to an egress IF unit. Then, the egress IF unit selects a work path or a protection path based on reported path information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. Transmission equipment comprising:
    a first interface unit configured to receive a frame; and
    a second interface unit configured to transmit the received frame received by the first interface unit, wherein
    the second interface unit includes a transmission circuit configured to transmit path information that represents a state of a logical path pair including a work path and a protection path provided for the received frame to the first interface unit, and
    the first interface unit includes a destination determination circuit configured to determine a destination of the received frame based on the state of the logical path pair represented by the path information received from the second interface unit.

2. The transmission equipment according to claim 1, wherein
    the second interface unit further includes:
        a path information storage configured to store the path information; and
        a management frame reception circuit configured to receive a management frame periodically transmitted from correspondent equipment, and
    the path information of the work path or the protection path through which the management frame has not been received by the management frame reception circuit for a specified period of time is updated to a state indicating a failure.

3. The transmission equipment according to claim 2, wherein
    the path information storage stores the path information for respective logical path pairs.

4. The transmission equipment according to claim 2, wherein
    the transmission circuit periodically reads the path information stored in the path information storage and transmits the read path information to the first interface unit.

5. The transmission equipment according to claim 1, further comprising a switch circuit configured to transfer the received frame between the first interface unit and the second interface unit, wherein
    the transmission circuit transmits the path information to the first interface unit via the switch circuit.

6. The transmission equipment according to claim 5, wherein
    the transmission circuit generates a path management frame including the path information and transmits the path management frame to the first interface unit via the switch circuit.

7. The transmission equipment according to claim 6, wherein
    the transmission circuit gives priority information that represents a priority higher than the received frame to the path management frame.

8. The transmission equipment according to claim 5, wherein
    the switch circuit guides the path information transmitted from the second interface unit to a plurality of interface units including the first interface unit.

9. The transmission equipment according to claim 1, wherein
    the first interface unit includes a management information storage that stores the path information transmitted from the second interface unit for respective logical path pairs, and
    the destination determination circuit selects one of first destination and second destination corresponding to a logical path pair assigned to the received frame, based on path information that is stored in the management information storage and that corresponds to the logical path pair assigned to the received frame.

10. The transmission equipment according to claim 9, wherein
    the management information storage stores first path information transmitted from an interface unit accommodating a work path for the received frame and second path information transmitted from an interface unit accommodating a protection path for the received frame in such a manner that the first path information and the second path information are associated with the logical path pair for the received frame.

11. The transmission equipment according to claim 10, wherein
    the management information storage updates information representing a state of the work path based on the first path information and updates information representing a state of the protection path based on the second path information.

12. The transmission equipment according to claim 11, wherein
    the destination determination circuit selects the first destination for the received frame when a work path in a logical path pair that has been assigned to the received frame is normal, and selects the second destination for the received frame when a work path in a logical path pair that has been assigned to the received frame is not normal and a protection path in the logical path pair is normal.

13. The transmission equipment according to claim 9, wherein
    the management information storage stores forced switching information representing whether to execute forced switching of a logical path, and
    the destination determination circuit selects a specified destination for the received frame when the forced switching information associated with a logical path pair assigned to the received frame represents execution of forced switching of a logical path.

14. A transmission method used in transmission equipment including a first interface unit that receives a frame and a second interface unit that transmits the received frame received by the first interface unit, the transmission method comprising:
    collecting, in the second interface unit, path information that represents a state of a logical path pair including a work path and a protection path provided for the received frame;

transmitting the path information from the second interface unit to the first interface unit; and determining, in the first interface unit, a destination of the received frame based on the state of the logical path pair represented by the path information received from the second interface.

15. Transmission equipment comprising:

a first interface unit configured to process a received frame of a work path;

a second interface unit configured to process a received frame of a protection path corresponding to the work path; and a third interface unit configured to select one of the received frame of the first interface unit and the received frame of the second interface, wherein the first interface unit includes a first transmission circuit configured to transmit first path information representing a state of the work path to the third interface unit, the second interface unit includes a second transmission circuit configured to transmit second path information representing a state of the protection path to the third interface unit, and the third interface unit includes a selector configured to select one of the received frame of the first interface unit and the received frame of the second interface unit based on the first and second path information.

* * * * *